United States Patent [19]

Flanders, Sr.

[11] Patent Number: 4,815,227
[45] Date of Patent: Mar. 28, 1989

[54] ANTI-DRIFTING FISH LANDING NET
[76] Inventor: Ralph Flanders, Sr., 19726 Rolling Acre Dr., South Bend, Ind. 46614
[21] Appl. No.: 223,348
[22] Filed: Jul. 25, 1988
[51] Int. Cl.[4] .................. A01K 77/00; A01K 75/00
[52] U.S. Cl. .......................................... 43/11; 43/12; 43/7
[58] Field of Search ................... 43/7, 11, 12, 1, 134
[56] References Cited

U.S. PATENT DOCUMENTS

| 525,619 | 9/1894 | Pearsons | 43/12 |
| 2,688,815 | 9/1954 | Phillips | 43/12 |
| 3,023,530 | 3/1962 | Jacob | 43/12 |
| 4,571,875 | 2/1986 | Ballas | 43/11 |

Primary Examiner—Nicholas P. Godici
Assistant Examiner—William Scott Andes
Attorney, Agent, or Firm—Thomas J. Dodd

[57] ABSTRACT

A fish landing net having a cord attached to the apex of the net webbing for preventing drifting of the webbing during landing of a fish. One end of the cord is attached to the apex of the webbing and the other is attached to a weight slidably received within the hollow portion of the landing net handle.

6 Claims, 5 Drawing Sheets

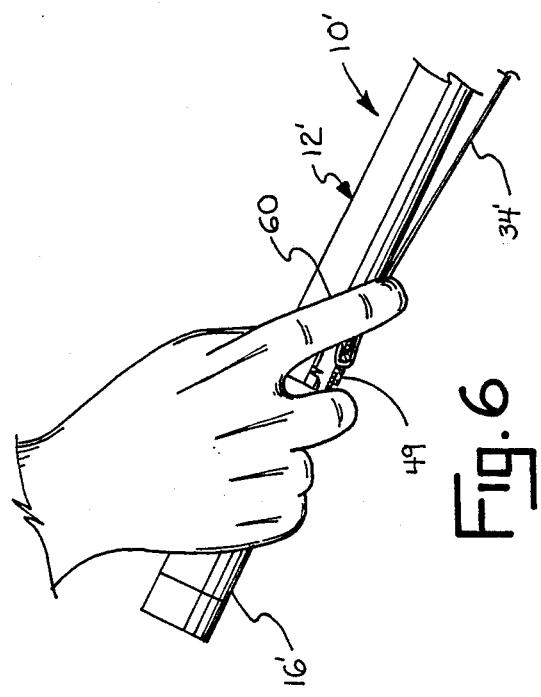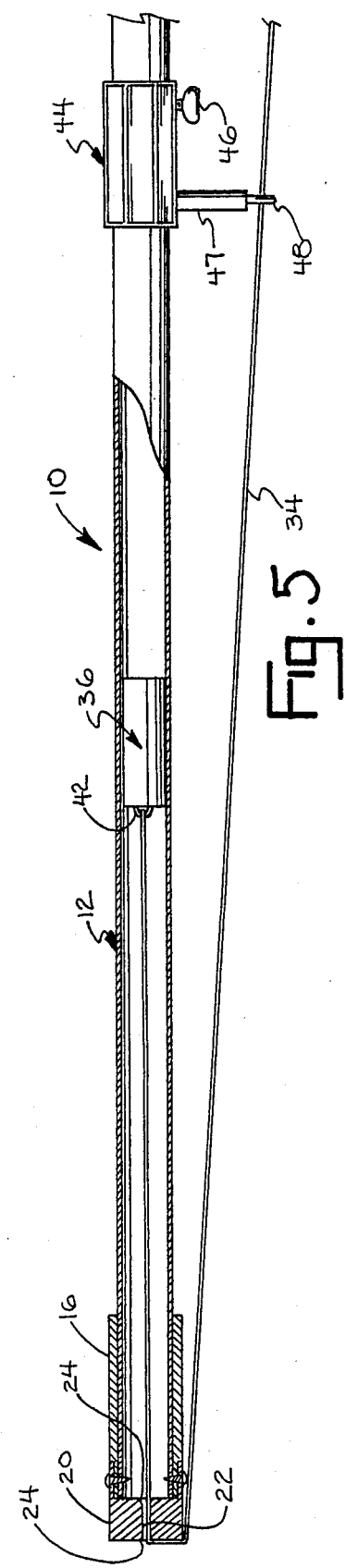

ANTI-DRIFTING FISH LANDING NET

BACKGROUND OF THE INVENTION

This invention relates to a fish landing net and will have application to a landing net wherein the net webbing is maintained tight against the frame until a fish enters the net webbing.

Heretofore, fish landing nets typically include a frame member having a handle and a looped end. A net webbing having an apex was attached to its open end to the frame looped end. One problem associated with landing nets is that during landing of a fish in a current or when the boat is trolling the net webbing is often pulled downstream of the looped end and in the path of the hooked fish. Such a situation can cause loss of the fish and quite possibly loss of the fishing gear that becomes entangled in the net. One attempt to combat the problem above is illustrated in U.S. Pat. No. 4,571,875 issued Feb. 25, 1986 to William E. Ballas. The Ballas patent discloses a fish landing net having a tension spring journalled within the handle and a cord wound thereon with its free end secured to the webbing apex for holding the netting collapsed against the handle when the webbing is empty. One problem associated with the Ballas patent is that the tension on the cord is unadjustable and in strong currents could possibly allow the webbing to reverse itself as mentioned above. Another problem associated with the Ballas patent is the complex nature of the pretension pulley arrangement and excessive cost required to journal the pulley arrangement within the handle portion. Still another problem is that the Ballas patent does not lend itself to a fish landing net having a collapsible handle.

SUMMARY OF THE INVENTION

The fish landing net of this invention eliminates the problems described above by providing a cord attached at one end to the apex of the webbing and at the other end to a weight slidably retained within the handle part. As the net is positioned with the looped end lowered for use, the weight slides down the handle member toward the looped end to pull the apex of the webbing tight against the frame. A guide member is associated with the cord so as to maintain the cord a proper distance from the user's hand. The cord is positioned such that during stronger currents the user may simply grasp the cord with his hand to add additional tension to the cord. Further, the cord may be manually released to loosen the net or to reset the net if a fish is missed. Finally, after the fish is landed the cord may be pulled to tighten the net to aid in removing the fish. Since the weight is internal to the handle and the collar is slidable the invention is readily adaptable for use with a collapsible or non-collapsible landing net.

Accordingly, it is an object of this invention to provide for a fish landing net wherein the webbing portion may be maintained against the frame member.

Another object of this invention is to provide for a fish landing net wherein webbing reversal caused by current flow is eliminated.

Other objects of this invention will become apparent upon a reading of the following description taken with the accompanying drawings.

BRIEF DESCRIPTION OF THE DRAWINGS

FIG. 5 is a cross-sectional view of the invention fragmented taken generally along lines 5-5 of FIG. 1.

FIG. 6 is a perspective view fragmented illustrating an alternative embodiment of the invention having the cord passing through an opening in the handle side wall.

DESCRIPTION OF THE PREFERRED EMBODIMENTS

Figure 1:
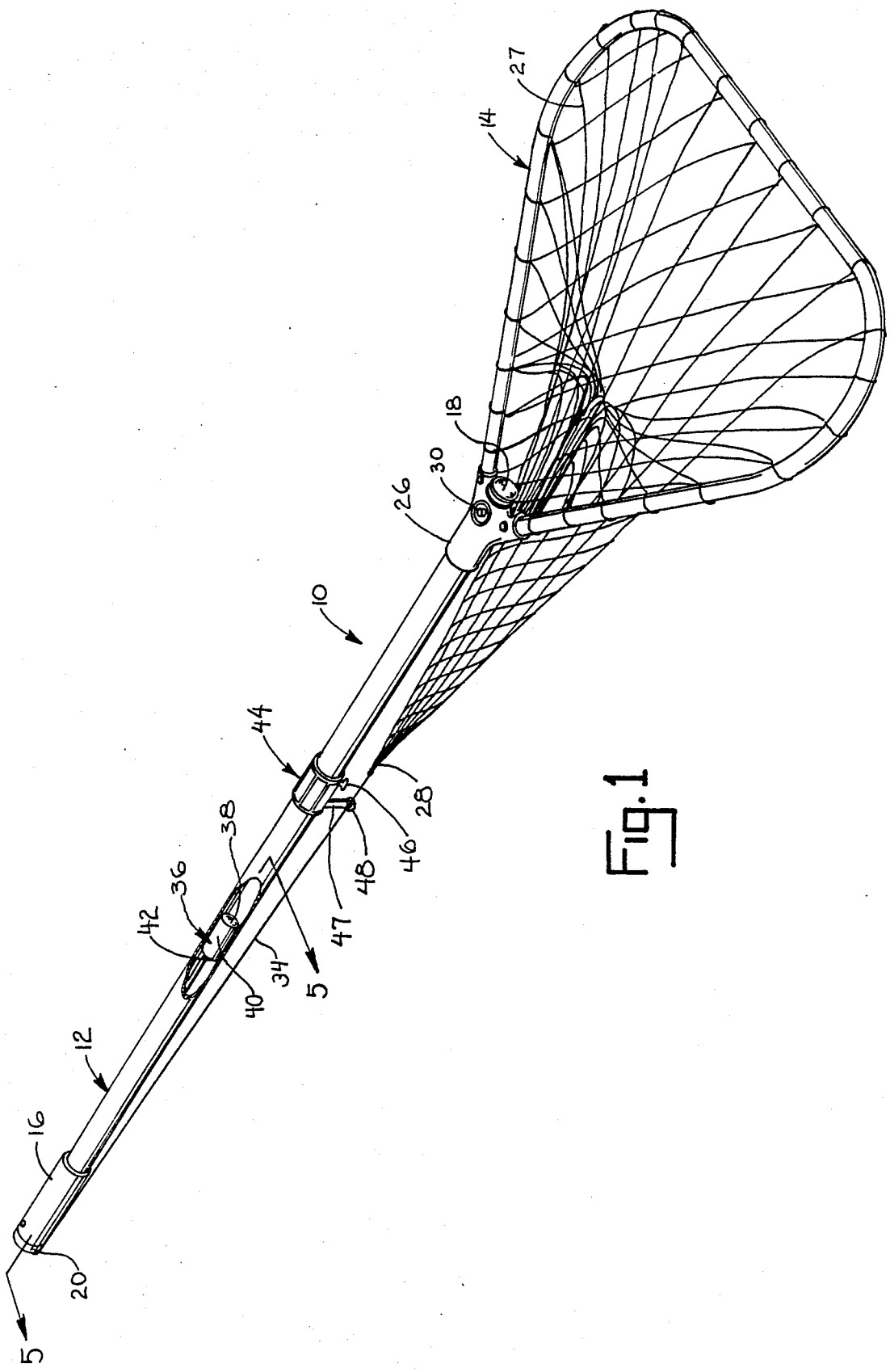
FIG. 1 is a perspective view of the invention illustrated in use with a collapsible net in its extended position with portions cut away for illustrative purposes.

The preferred embodiments herein disclosed are not intended to be exhaustive or to limit the application to the precise forms disclosed. Rather, they are chosen and described to best illustrate the invention and its use to enable those skilled in the art to utilize its teachings.

Referring now to the drawings, landing net 10 includes a handle 12 and a looped end portion 14. Handle 12 is preferably formed from a hollow tube and includes grip 16 and end cap 18. Grip 16 includes a cap 20 having a longitudinal bore 22 which has bevelled edges 24. Handle 24 is slidably received within yoke 26 of looped portion 14. A net webbing 27 having an apex 28 is connected in common fashion to the looped end of net 10. The preferred embodiment illustrates a collapsible landing net 10 wherein a biased retainer protrusion 30 extends through yoke 26 to maintain handle 12 in the extended position of FIG. 1. To collapse handle 12, protrusion 30 is pushed inwardly and grip member 16 is urged toward yoke 26. FIG. 2 illustrates landing net 10 in its collapsed position.

To maintain webbing member 27 tight against looped end 14 and handle 12, a cord 34 is attached between apex 28 and slidable weight 36. Weight 36 is positioned within hollow handle member 12 and has a diameter slightly less than that of the inner diameter of handle 12 to be freely slidable the length of the handle. Weight 36 is illustrated in the preferred embodiment as including a lead center 38 and an outer shell 40 which in the preferred embodiment is formed from copper. Eye 42 is connected to lead center 38 for attachment of cord 34 to the weight 36. It should be understood that weight 36 may be constructed from any material having sufficient weight to draw net 27 toward handle 12, such as a steel bar piece.

A slidable collar member 44 is positioned about handle 12 and includes a thumb screw 46. Eyelet 48 is connected to and spaced from collar 44 by extension 47 in a common manner. Collar 44 is slidable with relation to handle 12 and may be secured to the handle by engaging thumb screw 46 with handle 12 in a conventional manner.

Figure 2:
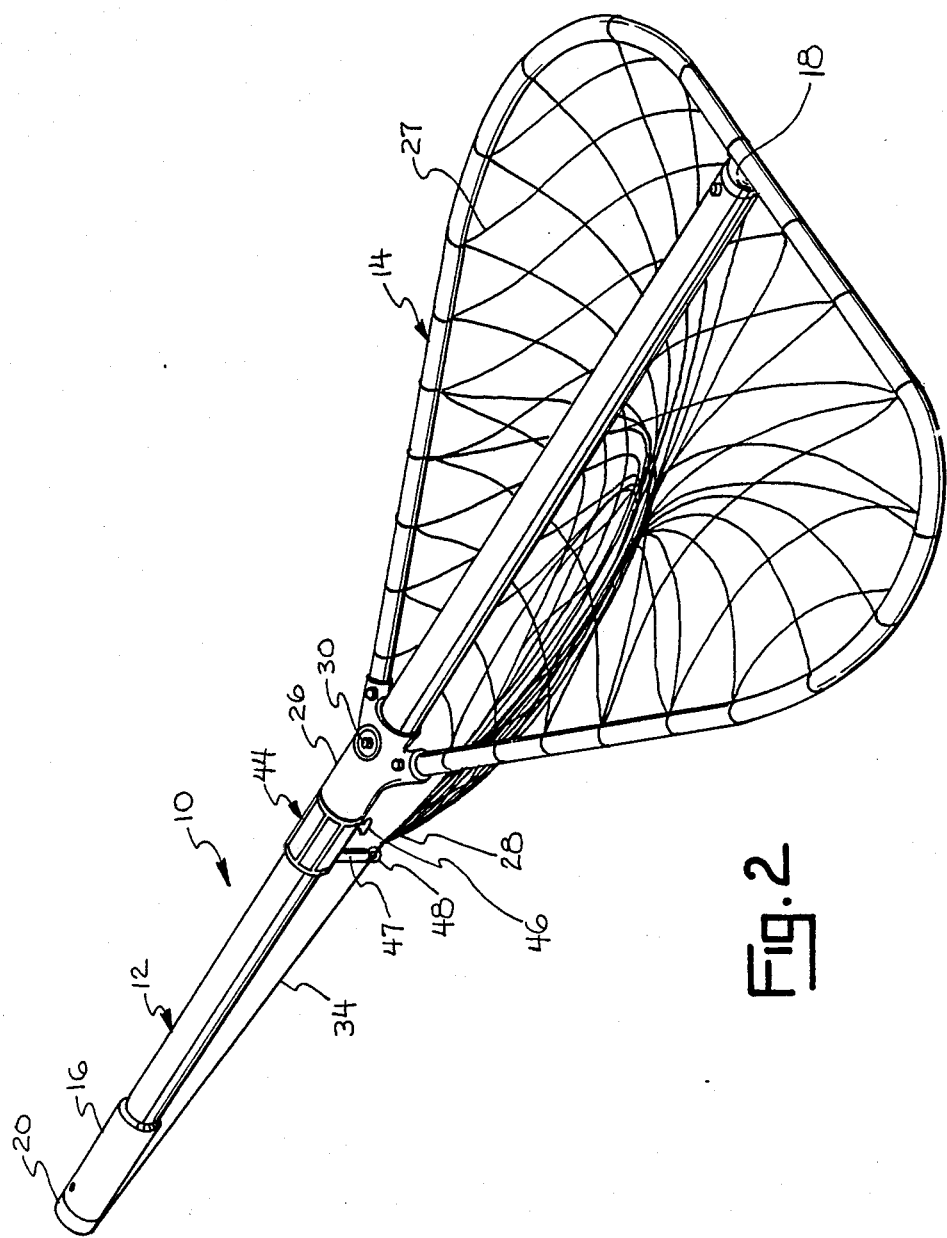
FIG. 2 is a perspective view of the collapsible net of FIG. 1 in its retracted position.
Figure 3:
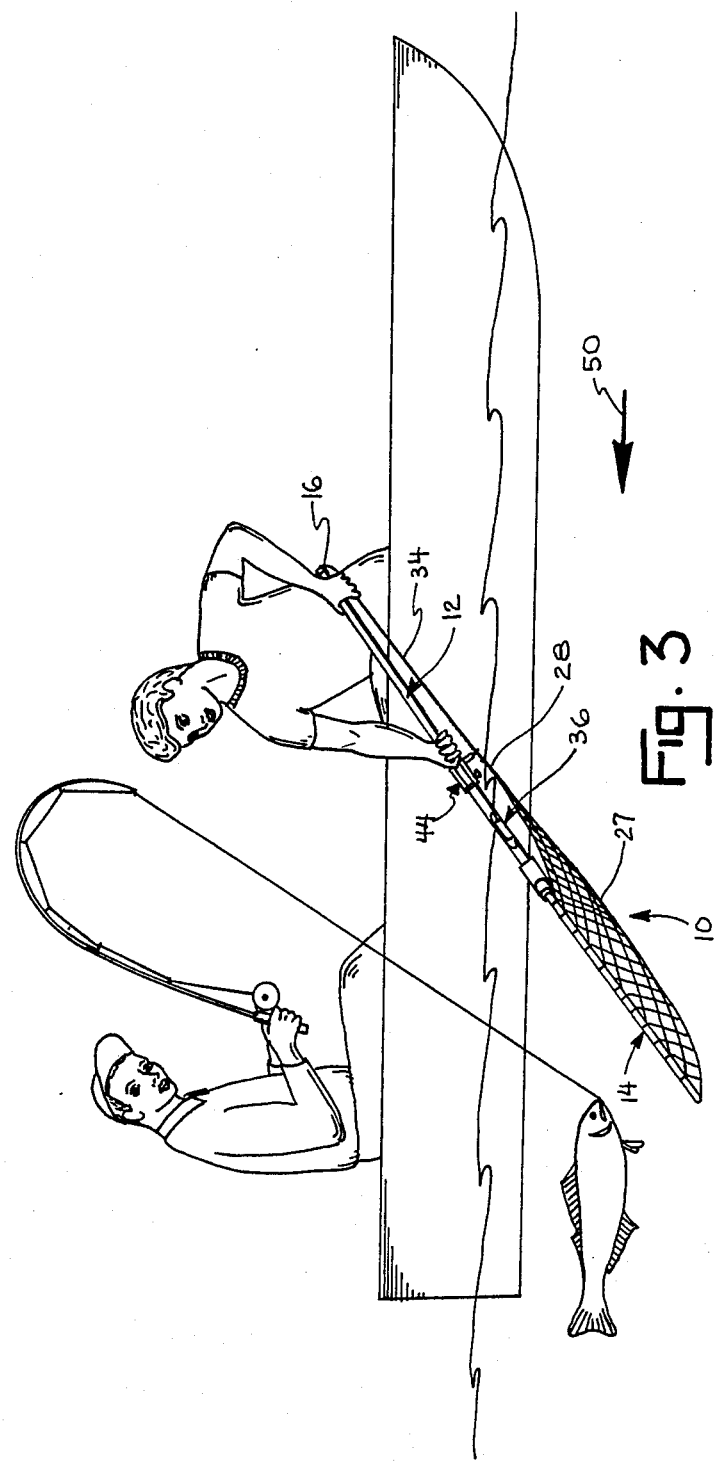
FIG. 3 is a perspective view of the invention in use prior to netting a hooked fish.

In use, with landing net 10 in its extended position of FIG. 1, a hooked fish is brought near the aft end of the boat with current flowing in the direction of arrow 50 (or in the alternative with the boat traveling in a direction opposite arrow 50). Net 10 is positioned as illustrated in FIG. 3 having the looped end portion 14 positioned substantially lower than grip member 16. It should be noted that one of the user's hands is positioned near collar 44 and the other on grip 16. In the position illustrated by FIG. 3 weight 36 is positioned near yoke 26 and cord 34 pulls webbing 27 taught against looped end 14 to prevent webbing 27 from drifting in the current illustrated by arrow 50.

Figure 4:
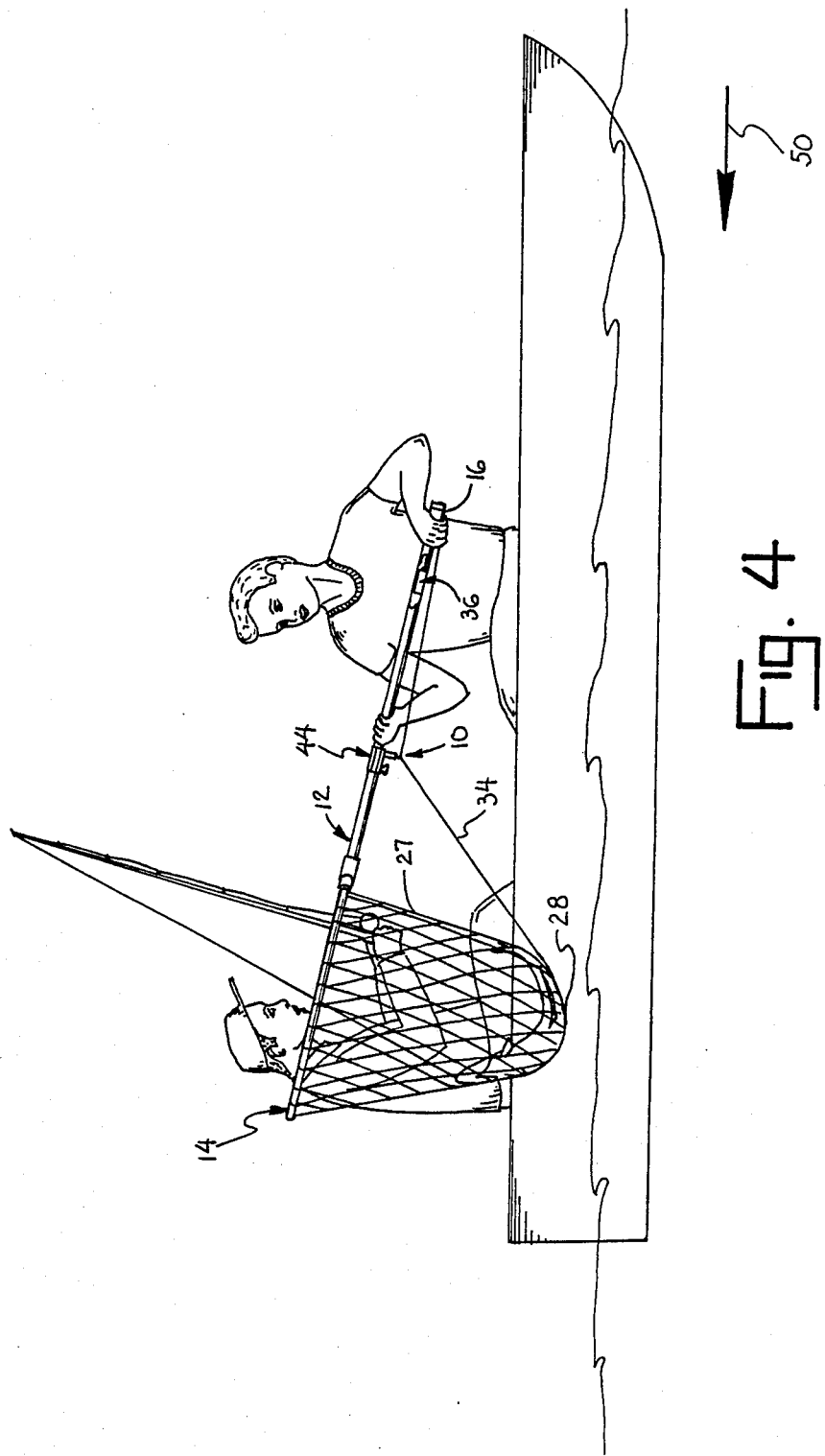
FIG. 4 is a perspective view of the invention in use with a fish netted.

As looped end 14 is raised relative to grip end 16 the weight of the fish pulls against net webbing 27 and extends it in the position illustrated by FIG. 4. Such webbing extension causes weight 36 to be pulled toward cap 22.

After the fish is removed from net webbing 27 it may again be tightened against the frame by lowering looped end 14 substantially below grip 16 to allow weight 36 to slide downwardly through handle 12 toward looped end 14.

In the event that the current or motion of the boat creates a greater pull on net webbing 27 than can be negated by weight 36 the user may extend his fingers and grasp cord 34 near grip 16. By positioning cord 34 near grip 16, the user may easily control the amount of tension placed upon net webbing 27.

By positioning cord 34 near grip member 16 the user may quickly reset net webbing 27 in the event of a missed fish for instance by pulling cord 34 toward grip 16. Further, if desired, net webbing 27 can be extended by the user pulling cord 34 from handle 12.

FIG. 6 illustrates an alternative embodiment of the landing net of this invention. Landing net 10' includes cord 34' which passes through a grommeted opening 49 formed on the side of handle 12' near grip member 16' of landing net 10'. Opening 49 is positioned such that the user may provide additional tension to cord 34' by looping his index finger 60 over cord 34'.

It should be understood that although a collapsible landing net is illustrated in the figures, the invention is equally applicable to a non-collapsible landing net. It should be further understood that the invention is not limited to the details of the embodiments above described but may be amended within the scope of the appended claims.

I claim:

1. In combination, a fish landing net having a handle connected to a looped member, net webbing connected to said looped member, and means connected to said net webbing for tightening said net webbing upon said looped member being positioned lower than said handle, said tightening means slidably received in said handle.

2. The combination of claim 1 wherein said tightening means includes a weight slidably carried in said handle and connected to said net member by a cord.

3. The combination of claim 2 wherein said weight is carried within said handle and said cord passes through an opening in said handle.

4. The combination of claim 3 wherein said handle opening is formed in an end of said handle.

5. The combination of claim 3 wherein said handle opening is formed within a side wall of said handle.

6. The combination of claim 2 and including spacer means connected to said handle near said looped member for engaging said cord and spacing said cord from said handle near said looped member.

* * * * *